(12) United States Patent
Kim et al.

(10) Patent No.: US 12,382,921 B2
(45) Date of Patent: Aug. 12, 2025

(54) TOILET TRAINING DEVICE FOR A PET

(71) Applicants: Tae-Hyun Kim, Incheon (KR);
Dong-Hyun Kim, Goyang-si (KR)

(72) Inventors: Tae-Hyun Kim, Incheon (KR);
Dong-Hyun Kim, Goyang-si (KR)

( * ) Notice: Subject to any disclaimer, the term of this patent is extended or adjusted under 35 U.S.C. 154(b) by 204 days.

(21) Appl. No.: 17/623,243

(22) PCT Filed: Jun. 17, 2020

(86) PCT No.: PCT/KR2020/007817
§ 371 (c)(1),
(2) Date: Dec. 28, 2021

(87) PCT Pub. No.: WO2021/002612
PCT Pub. Date: Jan. 7, 2021

(65) Prior Publication Data
US 2022/0361438 A1    Nov. 17, 2022

(30) Foreign Application Priority Data
Jul. 1, 2019   (KR) .......................... 10-2019-0078801

(51) Int. Cl.
*A01K 1/01*       (2006.01)
(52) U.S. Cl.
CPC .................................. *A01K 1/011* (2013.01)
(58) Field of Classification Search
CPC .... A01K 5/0114; A01K 5/0233; A01K 15/02; A01K 15/021; A01K 1/0107; C25D 5/14;
(Continued)

(56) References Cited

U.S. PATENT DOCUMENTS 4,837,050 A * 6/1989 Iwasa ...................... B05D 5/12
427/96
10,412,933 B2  9/2019 Eom
(Continued)

FOREIGN PATENT DOCUMENTS

CN      1899002 A  *  1/2007  ............... C25D 7/00
EP     417946 A2  *  3/1991  .............. C08J 7/047
(Continued)

OTHER PUBLICATIONS

International Search Report for PCT/KR2020/007817 mailed Oct. 12, 2020 from Korean Intellectual Property Office.

*Primary Examiner* — Peter M Poon
*Assistant Examiner* — Carly W. Lynch
(74) *Attorney, Agent, or Firm* — Revolution IP, PLLC

(57) ABSTRACT

The present invention relates to a toilet training device for a pet. More specifically, the present invention relates to the toilet training device for the pet, which allows the pet to receive the automatic toilet training to save an owner's time for training the pet in connection with the defecation, wherein it enables the more correct determination about the pet's defecation state, while simplifying a sensor plate configuration for detecting the pet's defecation state, so that it is possible to reduce manufacturing cost thereof. The present invention for obtaining the above goals comprises a defecation unit which receives pet's excrement; and a feeding unit for supplying snack in case that the pet defecates on the defecation unit, wherein the defecation unit comprises a sensor plate for sensing the defecation state of the pet and a collecting member located below the sensor plate.

9 Claims, 6 Drawing Sheets

(58) Field of Classification Search
CPC ...... H05K 3/467; H05K 3/4661; H05K 1/036; H05K 1/0298
See application file for complete search history.

(56) References Cited

U.S. PATENT DOCUMENTS

| | | | | |
|---|---|---|---|---|
| 2006/0141763 | A1* | 6/2006 | Brody | H01L 21/67173 |
| | | | | 438/622 |
| 2007/0252712 | A1 | 11/2007 | Allen et al. | |
| 2012/0299731 | A1* | 11/2012 | Triener | G16Z 99/00 |
| | | | | 702/19 |
| 2013/0105806 | A1* | 5/2013 | Liu | H10F 77/122 |
| | | | | 257/E21.318 |
| 2014/0033989 | A1* | 2/2014 | Ault | A01K 15/021 |
| | | | | 119/712 |

FOREIGN PATENT DOCUMENTS

| | | | | | |
|---|---|---|---|---|---|
| GB | 2519772 | A | * | 5/2015 | ........... A01K 13/006 |
| JP | 59-42440 | A | | 3/1984 | |
| JP | 2003163442 | A | * | 6/2003 | .............. H05K 1/02 |
| JP | 2004-507257 | A | | 3/2004 | |
| JP | 2017-020817 | A | | 1/2017 | |
| JP | 2019-110796 | A | | 7/2019 | |
| KR | 10-2004-0027806 | A | | 4/2004 | |
| KR | 20040027806 | A | * | 4/2004 | ............... E04B 1/80 |
| KR | 10-0609506 | B1 | | 8/2006 | |
| KR | 10-2008-0109506 | A | | 12/2008 | |
| KR | 20080109506 | A | * | 12/2008 | ........... A01K 1/0107 |
| KR | 10-2014-0108837 | A | | 9/2014 | |
| KR | 10-2014-0114420 | A | | 9/2014 | |
| KR | 20140114420 | A | * | 9/2014 | ............. B32B 27/08 |
| KR | 10-2017-0040032 | A | | 4/2017 | |
| KR | 20170040032 | A | * | 4/2017 | ........... A01K 1/0107 |
| KR | 10-2019-0019271 | A | | 2/2019 | |
| KR | 20190019271 | A | * | 2/2019 | ........... A01K 1/0107 |

* cited by examiner

Prior Art

Prior Art

TOILET TRAINING DEVICE FOR A PET

TECHNICAL FIELD

The present invention relates to a toilet training device for a pet. More specifically, the present invention relates to the toilet training device for the pet, which allows the pet to receive the automatic toilet training to save an owner's time for training the pet in connection with the defecation. Also, it relates to the toilet training device enabling the more correct determination about the pet's defecation state, while simplifying a sensor plate configuration for detecting the pet's defecation state, so that it is possible to reduce manufacturing cost thereof.

TECHNICAL BACKGROUND

Generally, a pet dog pees or poops on anywhere as well as on a blanket and a bed, if it is not well trained in connection with defecation. In such a case, an owner of a pet dog has difficulties for keeping the pet dog and may abandon his/her dog. Thus, the toilet training for the pet dog is very important, when keeping the pet dog indoors.

Normally, it takes about two months for toilet-training a young pet dog so as to keep it indoors, although it depends on the dog's intelligence. The owner of the pet dog should spend a lot of hard work and dedication in order to let the dog complete the toilet training.

In a conventional toile training for the pet dog, 3-4 sheets of newspaper staked on top of each other is used. If the pet dog shows a sign of defecation while being observed, it is brought to a place where the stack of newspaper is laid. Then, it is necessary to wait until the pet dog finishes the defecation. By doing so, the pet dog will get into the habit of defecating on the newspaper. Instead of the newspaper, a defecation plate or a defecation pad may be used.

On the other hand, stacking several sheets of the newspaper is to wet the newspaper below with the dog's urine and to soak the smell of urine on the newspaper. Also, it is to induce the dog to come to the previous defecation place by smelling its own urine on the newspaper when defecating later. However, such a toilet training requires a lot of time and effort from the owner, and thus, it is difficult to carry out the toilet training smoothly.

Accordingly, KR 10-2019-0019271 discloses a toilet training device for a pet in order to solve these problems. Referring to FIGS. 1 and 2, it comprises: a body 110 having shielding walls installed at side and rear surfaces; a mesh plate 120 with a sensor unit located on a bottom side of the body, which includes a light sensor 122, a humidity senor 123 and an ammonia senor 124; a removable defecation member 130 located under the mesh plate 120 for receiving pet's excrements; a weight sensor located under the defecation member 130 for measuring weight of urine or stool; a defecation plate 100 comprising a transmitter (not shown) for transmitting sensed information from the senor unit; a feeding module 210 for supplying a snack or foodstuff to the pet when the pet poops on the defecation plate 100; a sound recording module 220 enabling sound recording; a speaker module 230 outputting the sound recorded in the sound recording module 220 when the pet poops; a control module 240 for determining whether or not the pet poops on the defecation plate 100 and for operating the feeding module 210 when the pet poops thereon; and a feeder 200 comprising a receiver (not shown) for receiving sensed information of the sensor unit from the transmitter.

The disclosure in KR 10-2019-0019271 is advantageous because the toilet training for the pet is automatically carried out and an owner of the pet does not have to spend a long time for training. However, a number of sensors are necessary for sensing and analyzing the pet's defecation. Thus, it has problems, such as complex configuration, high manufacturing cost and frequent breakdown.

SUMMARY OF THE INVENTION

The present invention is to solve the above-described problems. The object of the present invention is to provide a toilet training device for a pet, which allows the pet to receive the automatic toilet training to save an owner's time for training the pet in connection with the defecation, wherein it enables the more correct determination about the pet's defecation state, while simplifying a sensor plate configuration for detecting the pet's defecation state.

The other object of the present invention is to provide a toilet training device for a pet, which allows defecation situation to be monitored by sensing the pet's defecation state and sending defecation information to an owner's mobile terminal at a remote location in real time, wherein if more than a certain amount of excrement is collected in a defecation unit, the information thereof is sent to the mobile terminal so as to prevent excessive accumulation of excrement and to maintain pleasant environments.

In order to the above-described objects, the present invention provides a toilet training device for a pet comprising: a defecation unit which is place where the pet defecates; and a feeding unit for supplying snack in case that the pet defecates on the defecation unit.

The defecation unit comprises: a sensor plate for sensing the defecation state of the pet; and a collecting member located below the sensor plate.

The sensor plate comprises: a body in a mesh shape; and a conductive circuit formed on an upper surface of the body for sensing the defecation state.

The conductive circuit is formed to have a circuit part for + electricity and a circuit part for − electricity spaced apart from each other.

The upper surface of the body is formed to have installation grooves into which the conductive circuit is installed and the conductive circuit has plating layers, which are formed by plating in the order of a nickel layer, a copper layer and a nickel layer.

The conductive circuit further comprises a coating layer formed over the upper surface of the conductive circuit, which comprises cellulose derivatives.

The collecting member is formed with a receiving part for receiving the pet's excrement, wherein the collecting member is formed with hooking grooves at both sides of its upper end and wherein the sensor plate is formed with handles at both sides to be inserted in the hooking grooves so that the sensor plate is spaced apart from a bottom of the receiving part.

A disposable pad is further included within the receiving part.

The feeding unit further comprises a remote mobile terminal and a communication module, wherein the defecation state sensed from the sensor plate is transmitted to the mobile terminal through the communication module.

The mobile terminal calculates current amount of excrements received in the defecation unit based on the defecation state received and the warning that the defecation unit needs cleaning is given if the amount of excrements exceeds a predetermined value.

The conductive circuit is formed by fusing conductive metal and the upper surface of the body with the use of a heat-bonding method or a high-frequency fusion method.

The conductive circuit is directly formed on the upper surface of the body by a silk screen method or a pad printing method and a conductive paste and an adhesive is used as main materials.

After printing on a film a conductive paste and an adhesive, which are used as main materials, the conductive circuit is formed by bonding the film to the upper surface of the body.

Effect of the Invention

The present invention allows the pet to receive the automatic toilet training to thereby save an owner's time for training the pet in connection with the defecation. Also, it enables the more correct monitoring of the pet's defecation state, while simplifying a sensor plate configuration for detecting the pet's defecation state.

Also, the present invention allows defecation situation to be monitored by sensing the pet's defecation state and sending defecation information to an owner's mobile terminal at a remote location in real time. Also, if more than a certain amount of excrement is collected in a defecation unit, it is sent to the mobile terminal so as to prevent excessive accumulation of excrements. Thus, it is possible to maintain pleasant environments.

DETAILED DESCRIPTION OF THE INVENTION

Figure 1:
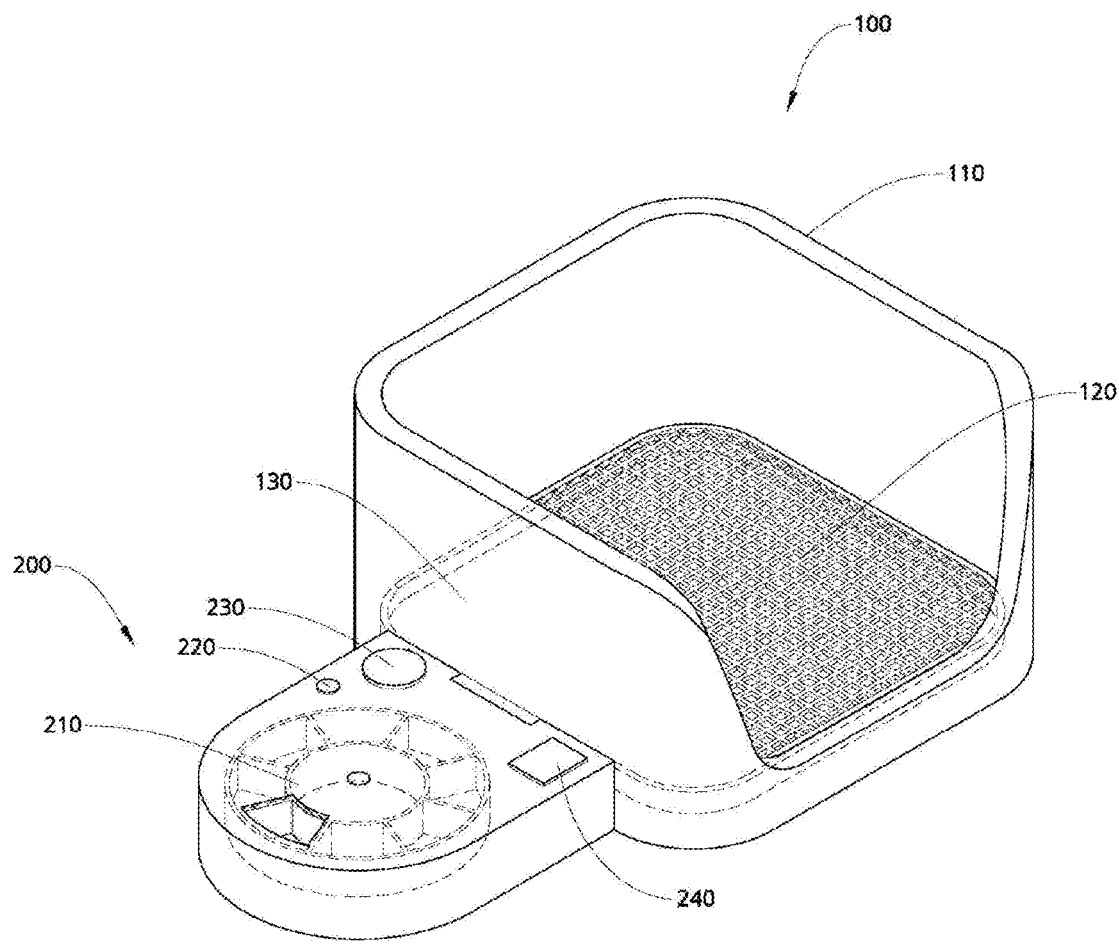
FIG. 1 is a perspective view of a conventional toilet training device for a pet.
Figure 2:
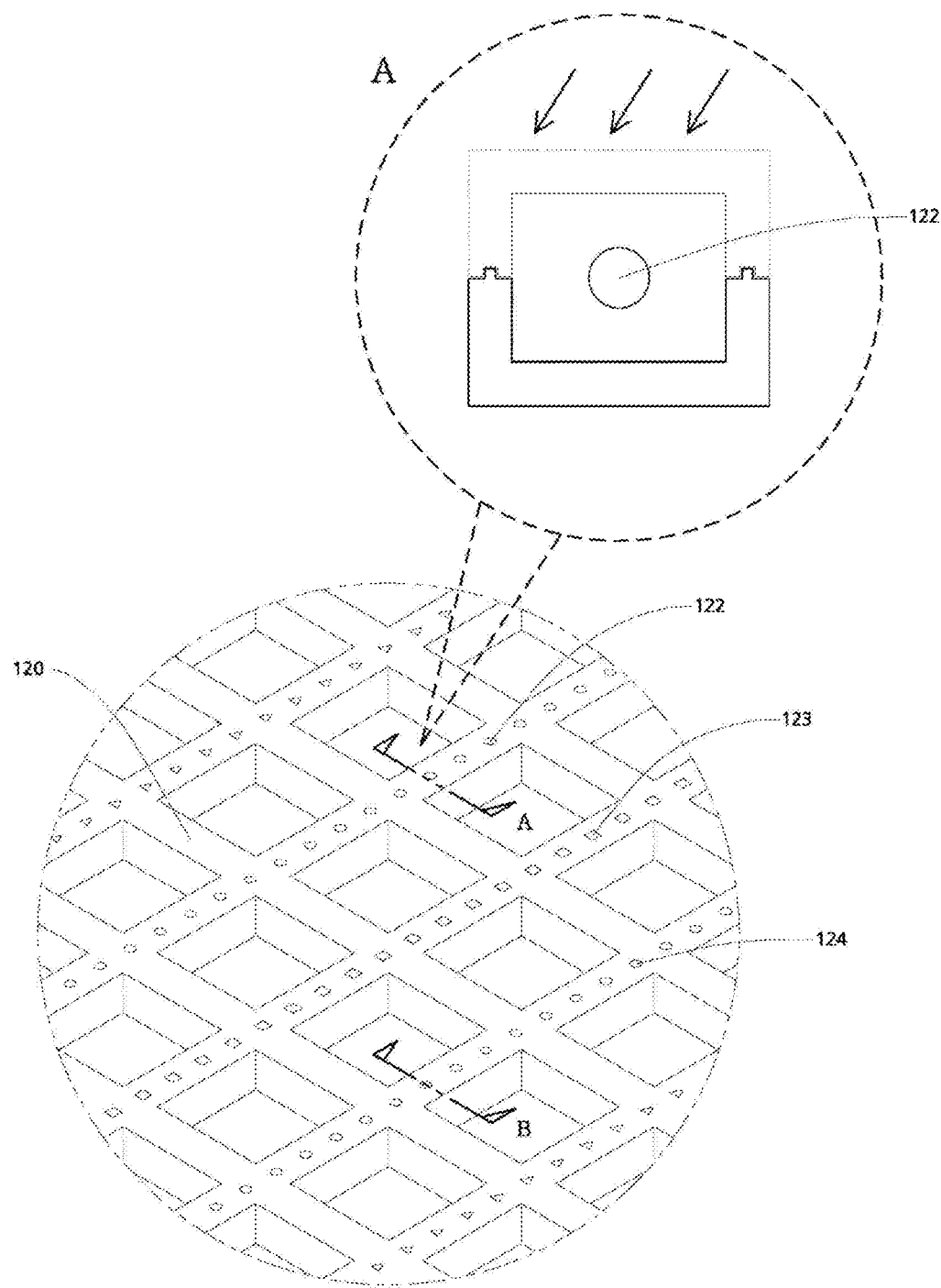
FIG. 2 is a detailed view of a mesh plate of the conventional toilet training device for the pet.

Hereinafter, preferred embodiments of the present invention will be described in more detail with reference to the accompanying drawings. The same reference numerals are used for the same components in the drawings, and repeated descriptions of the same components are omitted. Also, it should be understood that the present invention may be implemented in many different ways and is not limited to the described embodiments.

Figure 3:
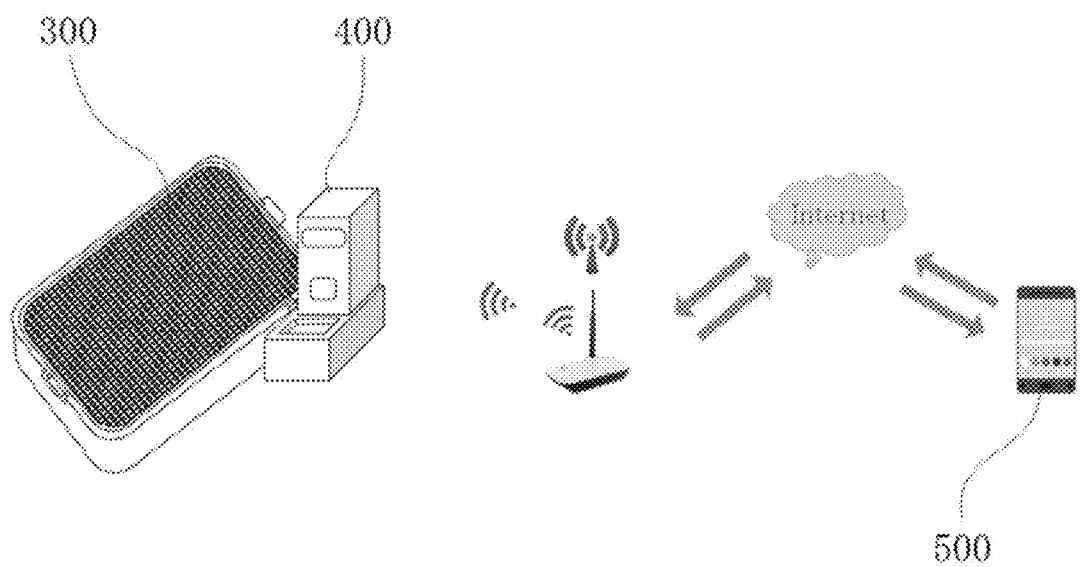
FIG. 3 shows a schematic configuration of the toilet training device for the pet according to the present invention.
Figure 4:
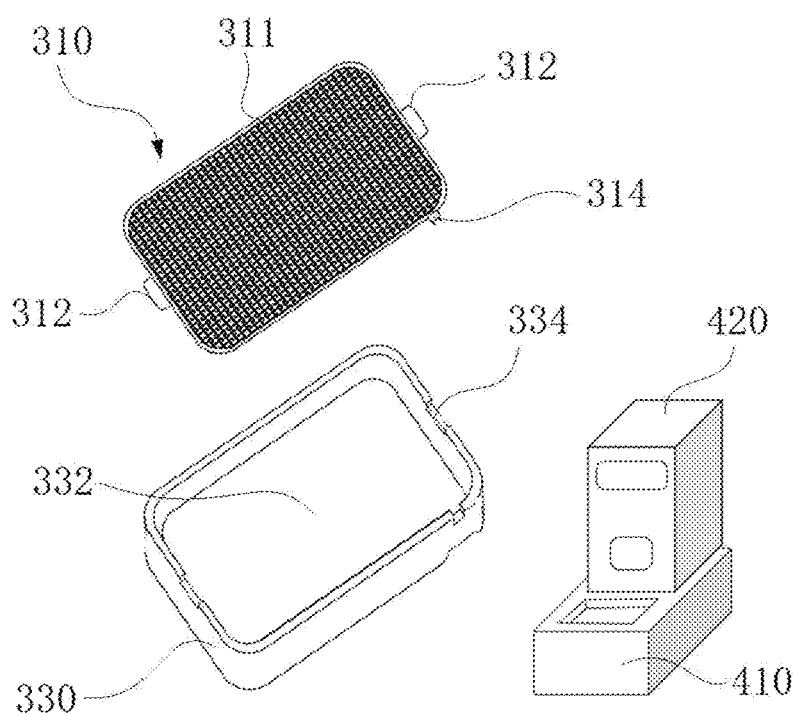
FIG. 4 is an exploded perspective view of a defecation unit of the toilet training device for the pet according to the present invention.
Figure 5:
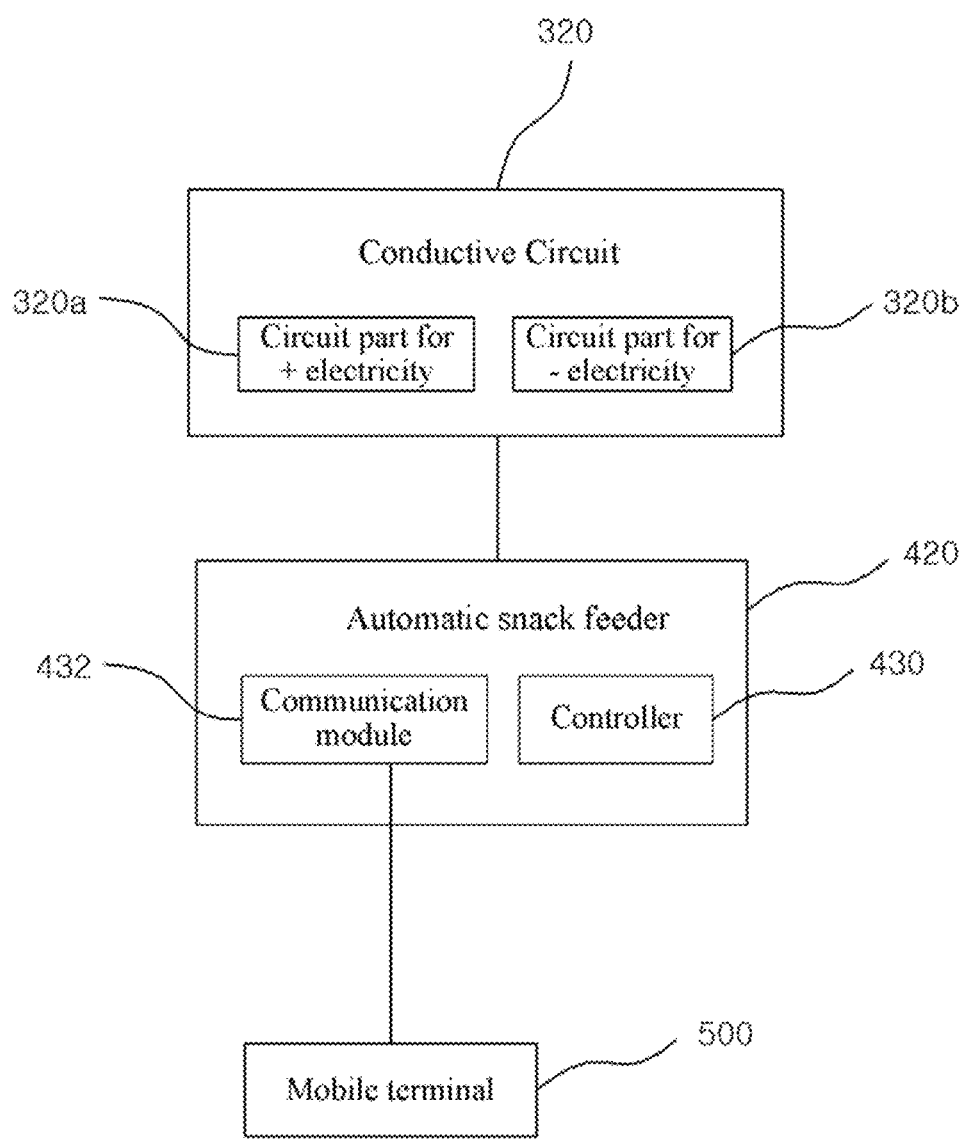
FIG. 5 is a block diagram of the toilet training device for the pet according to the present invention.
Figure 6:
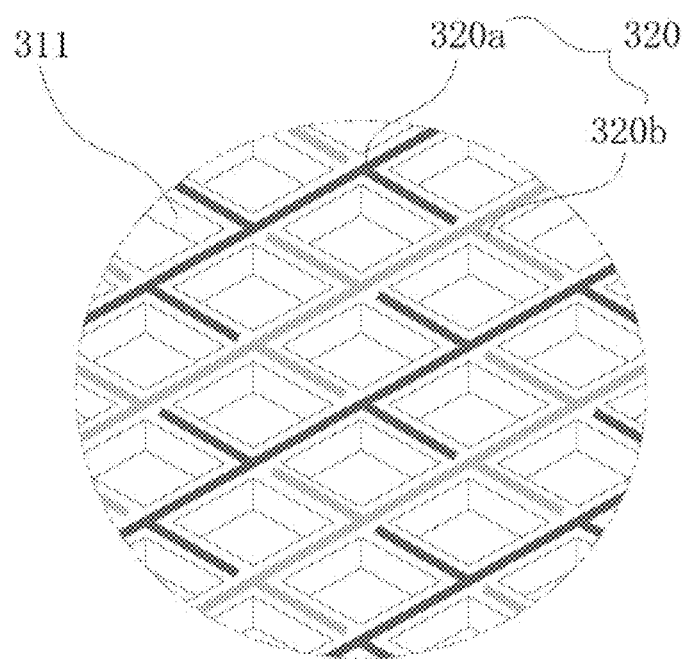
FIG. 6 is an enlarged view of a sensor plate in the defecation unit of the toilet training device for the pet according to the present invention.
Figure 7:
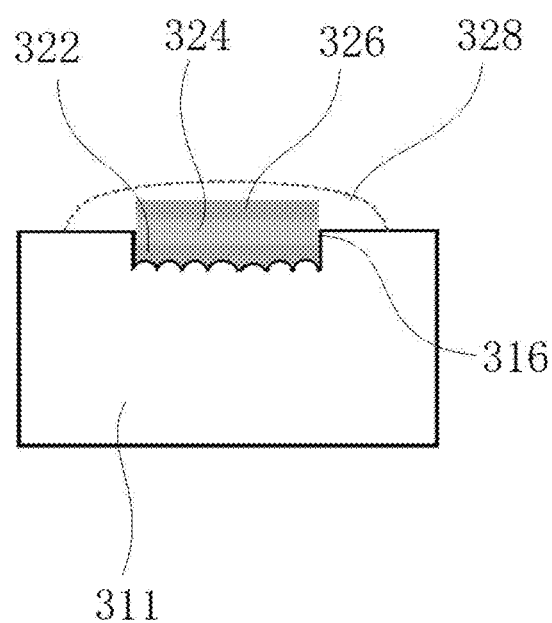
FIG. 7 is a sectional view of the sensor plate in the toilet training device for the pet according to the present invention.
Figure 8:
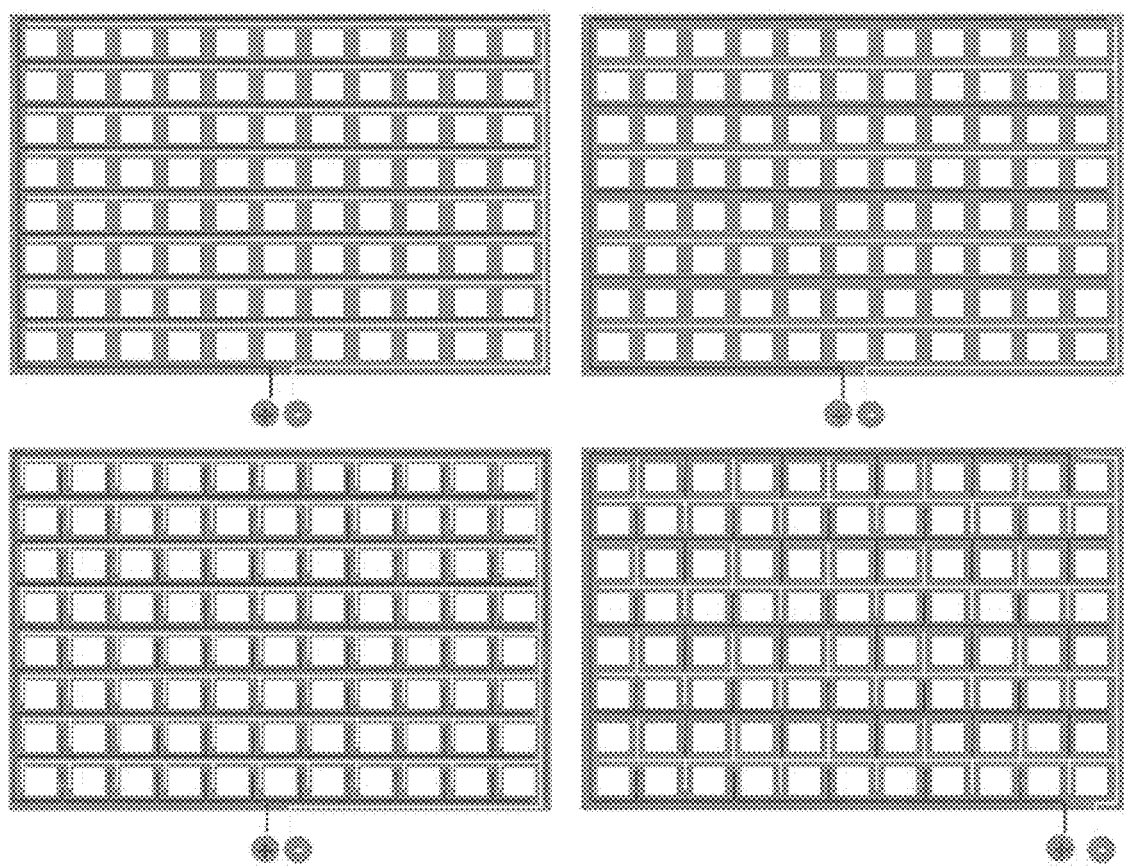
FIG. 8 is a plan view showing embodiments of various patterns of the conductive circuits in the toilet training device for the pet according to the present invention

FIG. 3 shows a configuration of the toilet training device for the pet according to the present invention; FIG. 4 is an exploded perspective view of a defecation unit of the toilet training device for the pet according to the present invention; FIG. 5 is a block diagram of the toilet training device for the pet according to the present invention; FIG. 6 is an enlarged view of a sensor plate in the defecation unit of the toilet training device for the pet according to the present invention; FIG. 7 is a sectional view of the sensor plate in the toilet training device for the pet according to the present invention; and FIG. 8 is a plan view showing embodiments of various patterns of the conductive circuits in the toilet training device for the pet according to the present invention The present invention relates to a toilet training device for pet. As shown in FIGS. 3 to 8, the toilet training device for the pet comprises: a defecation unit 300, which is a place where the pet defecates, and a feeding unit 400, which provides a snack when the pet defecates on the defecation unit 300.

Here, when the pet defecates, it is sensed in the defecation unit 300, and the feeding unit 400 receives a signal sensed by the defecation unit 300. If the defecation is in a normal state, the snacks stored within the feeding unit 400 are supplied.

Therefore, in the prior art, the owner had to train for a long time for the toilet training of the pet. However, the present invention enables automatic toilet-training through the toilet training device for the pet, and thus, the time that the owner should spend for the toilet training may be saved.

The defecation unit 300 comprises: a sensor plate 310 for sensing the defecation state of the pet; and a collecting member 330 located under the sensor plate 310 so as to receive the pet's excrements.

Here, the sensor plate 310 comprises: a body 311 in the form of a mesh, which enables the penetration; and a conductive circuit 320 formed on the upper surface of the body 311 for sensing the defecation state.

Here, a connection terminal 314 for providing electricity to the conductive circuit 320 is provided on a side of the sensor plate 310, and the conductive circuit 320 comprises a circuit part 320a for + electricity and a circuit part 320b for − electricity serving as a switch. The circuit part 320a for + electricity and the circuit part 320b for − electricity are positioned adjacent to each other, but they are formed to be spaced apart from each other.

Therefore, when the pet defecates on the upper part of the sensor plate 310, urine or feces is disposed to span the circuit part 320a for + electricity and the circuit part 320b for − electricity. Then, water component included in urine and feces allows the circuit parts 320a and 320b to be electrically connected, so that it is possible to monitor whether or not the pet defecates by sensing the electric connection.

Of course, when urine or stool dries over time, the electrical connection between the circuit part 320a for + electricity and the circuit part 320b for − electricity is terminated.

On the other hand, an installation groove 316 for installing the conductive circuit 320 is formed on the upper surface of the body 311, wherein the body 311 is made from synthetic resin (e.g., polycarbonate, etc.) that is easily softened by heat, and wherein the installation groove 316 is formed to have a groove shape on the upper surface of the body 311 using a Laser Direct Structuring (LDS) technique.

Here, the conductive circuit 320 is formed in the installation groove 316 by a plating method. In other words, the conductive circuit is formed by plating in the order of the nickel layer 322, the copper layer 324, and the nickel layer 326 from a bottom.

The copper layer 324 increases electrical conductivity, and the nickel layers 322 and 326 respectively formed on upper and lower surfaces of the copper layer 324 increases corrosion resistance. Thus, the phenomenon that the conductive circuit 320 is damaged from urine or stool is stably prevented.

The inner and lower surface of the installation groove 316 is formed to have a concave-convex shape, and the conductive circuit 320 is formed by plating, so that the bonding force increases. The installation groove 316 is formed to have a depth of about 5 to 6 μm, and the conductive circuit 320 is formed to have a thickness of 13 μm in total by forming the nickel layers 322 and 326 to have 3 μm, and forming the copper layer 324 to have 7 μm.

Accordingly, the conductive circuit 320 protrudes beyond the upper surface of the installation groove 316, so that the conductive circuit is in more stable contact with the pet's excrement. As a result, it is possible to detect the occurrence of the pet's defecation more accurately.

In addition, a coating layer 328 may be further formed over the conductive circuit 320, wherein the coating layer 328 is formed from a cellulose derivative. Thus, it is possible to maintain electrical conductivity, while stably preventing corrosion that may occur in a washing process, etc.

Here, the pattern of the conductive circuit 320 may be formed in various patterns as shown in FIG. 8 as well as the patterns shown in FIGS. 6 and 7. Also, various patterns not shown in the drawings are available.

In the other embodiment of the present invention, when forming the conductive circuit 320 on the upper surface of the body 311, the conductive circuit 320 may be formed by fusing conductive metal and the upper surface of the body 311 with the use of a heat-bonding method or a high-frequency fusion method, other than the above-described LDS technique.

In addition, the conductive circuit 320 may be directly formed on the upper surface of the body 311 by silk screen or pad printing, wherein a conductive paste such as silver paste and an adhesive is used as main materials. Otherwise, after printing on a separate film (not shown) a conductive paste and an adhesive which is used as main materials, the conductive circuit 320 may be formed by bonding the printed film to the upper surface of the body 311.

Here, additional plating may be performed over the conductive circuit 320 in order to prevent damage such as corrosion, while increasing electrical conductivity.

The collecting member 330 is located under the sensor plate 310. The collecting member 330 is formed with a receiving part 332 therein. The collecting member 330 has an opening on its upper part so as to make it possible to collect the pet's excrements.

Here, the collecting member 330 is formed with hooking grooves 334 positioned at both sides of its upper end. Also, the sensor plate 310 is formed with handles 312 at both sides, which protrude outward. The handles 312 are inserted into the hooking grooves 334, so that the sensor plate 310 is securely supported on the collecting member 330 without swaying.

Since the handles 312 project beyond the hooking groves 334, the sensor plate 310 may be readily removed when the pet owner tries to remove the excrements collected in the collecting member 330.

On the other hand, the receiving part 332 further comprises a disposable pad (not shown). The disposable pad may absorb a certain amount of the pet's urine, and thus, the absorption of the pet's urine is possible, even if the pet urinates several times. Accordingly, it is possible to minimize bad smell.

The feeding unit 400 is provided at a side of the defecation unit 300. The defecation unit 300 is electrically connected to the feeding unit 300 through an electric wire connected to a connection terminal 314 formed at a side of the sensor plate 310.

The feeding unit 400 comprises a snack receiver 410 for receiving the snack, which will be supplied to the pet as a compensation, and an automatic snack feeder 420 for providing the snack into the snack receiver 410. The automatic snack feeder 420 includes a controller 430 for controlling the snack supply in accordance with a signal received from the defecation unit 300.

Various techniques are well known in connection with the automatic snack feeder 420, and thus, further description will not be given with respect thereto.

Additionally, a communication module 432 is further included in the automatic snack feeder 420 of the feeder unit 400. The communication module 432 transmits the defecation state, which is received from the defecation unit 300, to the mobile terminal 500 positioned at a remote location in real time through a wire or wireless communication network.

Accordingly, the owner who is positioned at a remote location can monitor the pet's defecation state in a real time with the use of the mobile terminal 500. Further, the mobile terminal 500 may calculate (presume) an amount of the pet's excrement currently received in the defecation unit 300 based on the defecation situation (the number of defecation). If the amount of the excrement exceeds a predetermined value, the waning that the defecation unit 300 needs cleaning is given.

Here, the capacity that a disposable pad can absorb is set by the owner, and the mobile terminal 500 determines the amount of urine that the pet excretes at one time based on the pet's age, weight, breed etc. On the basis thereof, the number of pees that the disposable pad can absorb is counted. When the received number of pees is coincident with the counted number, a warning will be given to the owner (the user), to thereby let the owner handle the situation quickly.

If the user (owner) finishes cleaning the defecation unit 300, the cleaning state may be uploaded in the mobile terminal 500 and the number of the defecation may be re-counted.

The body 311 further comprises a heater (not shown) made of heating wires, in addition to the conductive circuit 320. When the controller 430 senses the defecation state through the conductive circuit 320, it can cause the heater to operate for rapidly drying excrements on the sensor plate 320. Thus, it is possible to prevent odor of excrements from being spread.

Under the circumstance that continuous defecation signals from the conductive circuit 320 are sensed owing to undried excrements, a correct sensing may be impossible, if the pet additionally poops or fees. Thus, the correct sensing is available by rapidly drying the excrement, even if the pet additionally defecates.

Although preferred embodiments of the present invention have been described above, the scope of the present invention is not limited thereto. The scope of the rights of the present invention extends to those that are substantially equivalent to the embodiments of the present invention. Various modifications can be made by those of ordinary skill in the art to which the invention pertains without departing from the spirit of the invention.

INDUSTRIAL APPLICABILITY

The present invention relates to a toilet training device for pet. More specifically, the present invention relates to the toilet training device for pet, which allows the pet to receive the automatic toilet training to save an owner's time for training the pet in connection with the defecation, wherein it enables the more correct monitoring of the pet's defecation state, while simplifying a sensor plate configuration for detecting the pet's defecation state, so that it is possible to reduce manufacturing cost thereof.

The invention claimed is:

1. A toilet training device for a pet consisting of:
   a defecation unit which is a place where the pet defecates; and
   a feeding unit for supplying a snack when the pet defecates on the defecation unit,
   wherein the defecation unit consists of:
      a sensor plate for sensing the defecation state of the pet; and
      a collecting member located below the sensor plate,
   wherein the sensor plate consists of:
      a body in a mesh shape; and
      a conductive circuit formed on an upper surface of the body for sensing the defecation state,
   wherein the upper surface of the body is formed to have installation grooves having a depth of 5 to 6 μm into which the conductive circuit is installed and a coating layer directly covering the conductive circuit and a part of the upper surface of the body,
   wherein the conductive circuit has only three plating layers, which are formed by plating in the order of a first nickel layer having a thickness of 3 μm, a copper layer having a thickness of 7 μm, and a second nickel layer having a thickness of 3 μm so that the second nickel layer directly contacts with the copper layer without contacting the first nickel layer,
   wherein each of the first nickel layer, the copper layer, and the second nickel layer has a same width throughout a length of the conductive circuit,
   wherein the width of the conductive circuit is equal to a width of the installation groove so that the first nickel layer and a portion of the copper layer completely fill in the installation groove,
   wherein the coating layer is made of a cellulose derivative to prevent from corrosion,
   wherein the conductive circuit protrudes beyond the upper surface surrounding the installation groove,
   wherein the conductive circuit is formed in a grid pattern consisting of a plurality of horizontal lines and vertical lines intersecting perpendicular to each other.

2. The toilet training device as claimed in claim 1, wherein the conductive circuit is formed to have a circuit part for + electricity and a circuit part for − electricity spaced apart from each other.

3. The toilet training device as claimed in claim 1, wherein the collecting member is formed with a receiving part for receiving the pet's excrement, wherein the collecting member is formed with hooking grooves at both sides of its upper end and wherein the sensor plate is formed with handles at both sides to be inserted in the hooking grooves so that the sensor plate is spaced apart from a bottom of the receiving part.

4. The toilet training device as claimed in claim 1, wherein a disposable pad is further included within the receiving part.

5. The toilet training device as claimed in claim 1, wherein the conductive circuit is formed by fusing conductive metal and the upper surface of the body with the use of a heat-bonding method or a high-frequency fusion method.

6. The toilet training device as claimed in claim 1, wherein the conductive circuit is directly formed on the upper surface of the body by a silk screen method or a pad printing method and wherein a conductive paste and an adhesive is used as main materials.

7. The toilet training device as claimed in claim 1, wherein after printing on a film a conductive paste and an adhesive, which are used as main materials, the conductive circuit is formed by bonding the film to the upper surface of the body.

8. A toilet training device for a pet comprising consisting of:
   a defecation unit which is a place where the pet defecates; and
   a feeding unit for supplying a snack when the pet defecates on the defecation unit, the feeding unit consists of:
      a remote mobile terminal; and
      a communication module
   wherein the defecation unit consists of:
      a sensor plate for sensing the defecation state of the pet; and
      a collecting member located below the sensor plate,
   wherein the sensor plate consists of:
      a body in a mesh shape; and
      a conductive circuit formed on an upper surface of the body for sensing the defecation state,
   wherein the upper surface of the body is formed to have installation grooves having a depth of 5 to 6 μm into which the conductive circuit is installed and a coating layer directly covering the conductive circuit and a part of the upper surface of the body,
   wherein the conductive circuit has only three plating layers, which are formed by plating in the order of a first nickel layer having a thickness of 3 μm, a copper layer having a thickness of 7 μm, and a second nickel layer having a thickness of 3 μm so that the second nickel layer directly contacts with the copper layer without contacting the first nickel layer,
   wherein each of the first nickel layer, the copper layer, and the second nickel layer has a same width throughout a length of the conductive circuit,
   wherein the width of the conductive circuit is equal to a width of the installation groove so that the first nickel layer and a portion of the copper layer completely fill in the installation groove,
   wherein the coating layer is made of a cellulose derivative to prevent from corrosion,
   wherein the conductive circuit protrudes beyond the upper surface surrounding the installation groove,
   wherein the conductive circuit is formed in a grid pattern consisting of a plurality of horizontal lines and vertical lines intersecting perpendicular to each other,
   wherein the defecation state sensed from the sensor plate is transmitted to the mobile terminal through the communication module.

9. The toilet training device as claimed in claim 8, wherein the mobile terminal calculates current amounts of excrements received in the defecation unit based on the defecation state received and wherein a warning that the defecation unit needs cleaning is given if the amount of excrements exceeds a predetermined value.

* * * * *